United States Patent [19]

Prussin et al.

[11] Patent Number: 4,510,798

[45] Date of Patent: Apr. 16, 1985

[54] SHALLOW JUNCTION DEPTH MEASUREMENT METHOD

[75] Inventors: Simon A. Prussin, Los Angeles; Boris L. Hikin, Playa del Ray, both of Calif.

[73] Assignee: TRW Inc., Redondo Beach, Calif.

[21] Appl. No.: 451,373

[22] Filed: Dec. 20, 1982

[51] Int. Cl.³ .............................................. G01B 11/02
[52] U.S. Cl. ................................... 73/150 R; 73/104; 436/2; 436/164
[58] Field of Search .................. 73/104, 150 R, 105; 356/36; 33/174 P; 436/2, 5, 164

[56] References Cited

U.S. PATENT DOCUMENTS

| | | | |
|---|---|---|---|
| 3,490,873 | 1/1970 | Corl | 73/150 R UX |
| 4,103,542 | 8/1978 | Wheeler et al. | 73/105 |
| 4,235,018 | 11/1980 | Saberg | 73/150 R X |
| 4,391,044 | 7/1983 | Wheeler | 33/174 P |

OTHER PUBLICATIONS

Hardwick, Rev. Sci. Instrum., vol. 42, No.4, (Apr. 1971), pp. 541–543.
Yeh, IBM Technical Disclosure Bulletin, vol. 5, No. 5, Oct. 1962, "Portraying PN Junctions in Gallium Arsenide".

Primary Examiner—Arnold Turk
Attorney, Agent, or Firm—Robert M. Wallace; Noel F. Heal; Donald R. Nyhagen

[57] ABSTRACT

A technique for accurately and repeatably measuring the depths of junctions between adjacent layers in a semiconductor wafer, even when the depths are relatively shallow. A groove is formed in the surface of the wafer, with a cylindrical grooving tool that is inclined to the planar surface of the wafer, to form a groove that is tapered in width and depth. The wafer is then conventionally treated to enhance the contrast between the layers as they are exposed on the groove surface. Since each planar junction intersects the groove surface at an angle, the corresponding junction line appears as a part of an ellipse, and exhibits a well defined peak at the center of the groove. Direct measurement of the depth of the groove at this point, using a standard profilometer, provides the desired junction depth.

11 Claims, 8 Drawing Figures

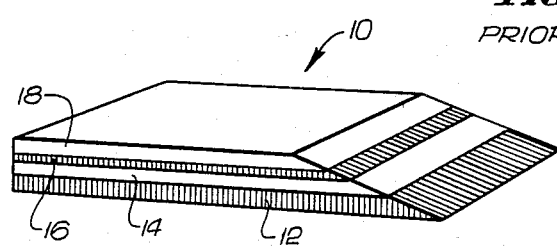
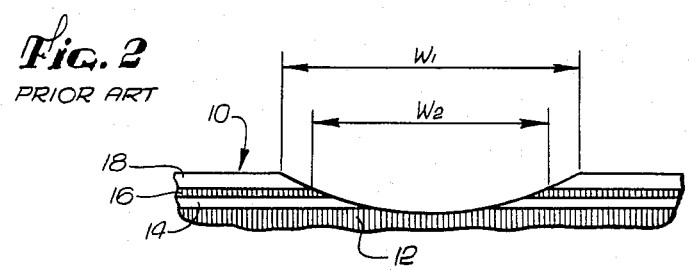
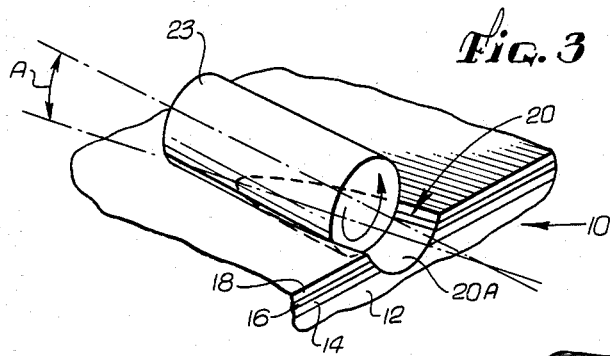
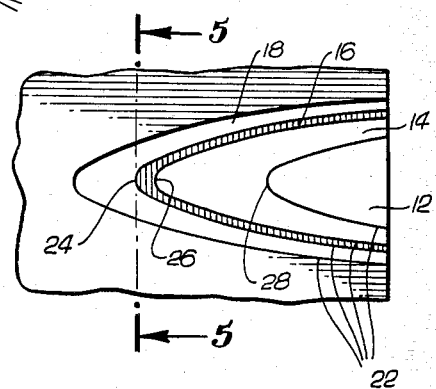
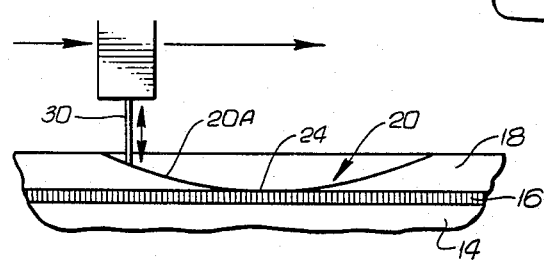

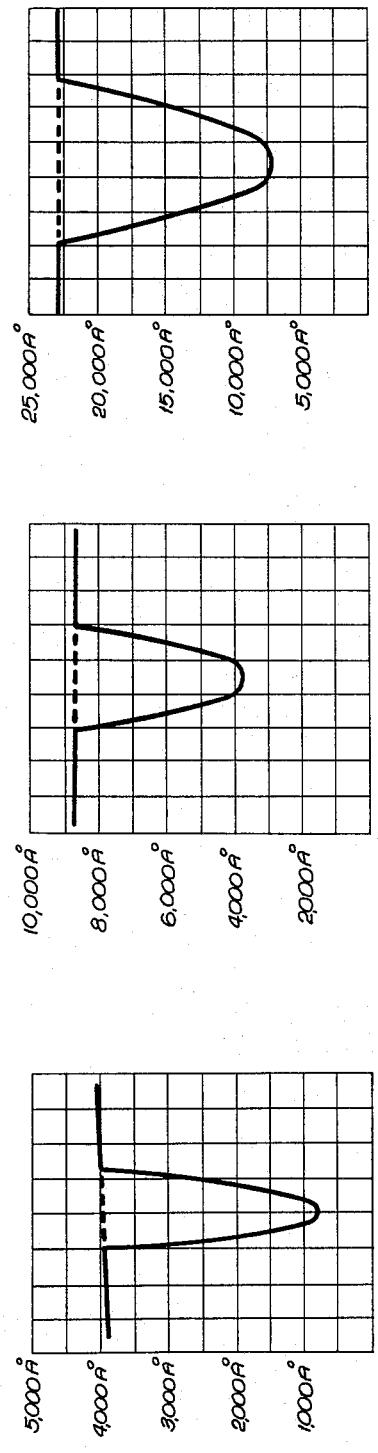

SHALLOW JUNCTION DEPTH MEASUREMENT METHOD

The Government has rights in this invention pursuant to Military Contract No. N00039-81-C-0414 awarded by The Department of the Navy.

BACKGROUND OF THE INVENTION

This invention relates generally to the manufacture of integrated circuitry, and more particularly, to techniques for the measurement of junction depths in integrated circuits. Integrated circuits include multiple layers of materials having differing physical and electrical properties. The materials may be doped with small concentrations of impurities to provide p-type or n-type semiconductive regions. The spatial position of a junction between two layers of different type is often highly critical to the operating characteristics of the resulting device, and various techniques have been devised to determine the depth of such a junction.

Since the first development of integrated circuitry, electronic components have been packed onto single substrates in ever increasing densities. In fact the packing density obtainable in integrated circuitry has increased by a factor of approximately four every two years. These higher densities have required closer junction spacings, and the need for a fast and accurate method of determining shallow junction depths has become increasingly acute.

A traditional method for junction depth measurement involves angle lapping and staining a semiconductor wafer, then measuring the distance of interest with an interference microscope. Basically, a wafer is angle-lapped at a relatively shallow angle with respect to its surface, thereby exposing the junctions between adjacent layers. The materials can be contrasted by appropriately staining the exposed cross section. Then the depth of any junction is measured along the lapped cross section, and the perpendicular depth is obtained mathematically from the measurement and the known lapping angle. This technique is described fully in a paper by C. P. Wu et al. entitled "Techniques for Lapping and Staining Ion-Implanted Layers," published in the Journal of the Electrochemical Society, Vol. 126, p. 1982 (1979), and permits the determination of junction depth to an accuracy of ±200 Å. In accordance with this angle lapping approach, a massive lapping jig must be employed, to eliminate rocking and insure a planar lapped surface. Also a material such as silicon dioxide ($SiO_2$) must be deposited on the silicon wafer surface prior to lapping, to avoid edge rounding of the surface.

More recently, T. T. Sheng et al. have developed a method of delineating shallow junctions in silicon structures using transmission electron microscopy, as described in their paper entitled "Delineation of Shallow Junctions in Silicon by Transmission Electron Microscopy," published in the Journal of the Electrochemical Society, Vol. 128, p. 881 (1981). Although this technique exhibits a high degree of accuracy and reproducibility, it requires a relatively lengthy time for preparation.

In another technique, the junction depth is determined by forming a shallow groove across the wafer surface with a cylindrical grooving tool, and measuring the width of the exposed junction and the width of the entire groove. In accordance with a simple mathematical relationship pointed out by B. McDonald et al in a paper entitled "Measurement of the Depth of Diffused Layers in Silicon by the Grooving Method," published in the Journal of the Electrochemical Society, Vol. 109, p. 141 (1962), the perpendicular depth of the junction can be calculated from these two measured distances and the known radius of the grooving tool. Major sources of error arise from the assumption of a perfectly cylindrical groove, and from the difficulty in exactly measuring the width of the groove. Moreover, for very shallow junctions the groove must also be very shallow, and the width of the exposed junction may be very close to the width of the entire groove. Accordingly, the possibility of error is greatly increased.

It will be appreciated from the foregoing that there is still an increasing need for a fast, accurate and reliable technique for measuring junction depths in integrated circuits, particularly circuits of high component density fabricated in very-large-scale integrated structures. The present invention fulfills this need.

SUMMARY OF THE INVENTION

The present invention resides in a novel method for the measurement of junction depths in semiconductor circuits. Basically, and in general terms, the method comprises the steps of forming in the surface of an integrated circuit wafer a recess having a concave wall surface which intersects the plane of a junction along a curved intersection line, staining the recess surface to identify the junction, and directly measuring the depth of the junction by measuring with a profilometer or other means the depth of the recess at a point of tangency of the curved intersection line with a plane normal to the wafer surface. In the preferred practice of the invention, the recess is a cylindrical groove whose axis is inclined at an angle to the wafer surface to produce a groove which is tapered in width and depth. Accordingly, the junction plane intersects the cylindrical groove surface at an angle to the groove axis, and therefore a continuous intersection line extending from one side of the groove to the other, with a clearly identifiable peak or apex at the bottom of the groove. The measuring step includes aligning a profilometer stylus with the peak of the junction line, and traversing the groove at that point with the stylus, to obtain a direct measurement of the junction depth. More specifically, the method also includes the step of cleaning the wafer after the step of forming the groove, to remove any debris before the staining and measuring steps.

Since the cylindrical groover and the profilometer are two devices frequently found in an integrated circuitry laboratory, the method of the invention is convenient to use, and provides an accurate and reliable measurement of shallow junction depths. Other aspects and advantages of the invention will become apparent from the following more detailed description, taken in conjunction with the accompanying drawings.

BRIEF DESCRIPTION OF THE DRAWINGS

FIG. 1 is a simplified perspective view of a semiconductor wafer after angle lapping in accordance with a prior-ar technique for determining junction depth;

FIG. 2 is a simplified cross-sectional view of a semiconductor wafer after cylindrical grooving in accordance with another prior-art technique for determining junction depth;

FIG. 3 is a simplified perspective view of a taper-grooving step of the present invention;

FIG. 4 is a fragmentary plan view of the wafer after the grooving step shown in FIG. 3 and a subsequent staining step;

FIG. 5 is a sectional view taken substantially along the line 5—5 and showing the motion of a profilometer stylus; and FIGS. 6a-6c are graphs obtained from profilometer readings taken at three junctions identifiable in FIG. 4.

DESCRIPTION OF THE PREFERRED EMBODIMENT

As shown in the drawings for purposes of illustration, the present invention is concerned with the determination of junction depths in semiconductor devices, and particularly relatively shallow junctions found in very-large-scale integrated circuitry. FIG. 1 shows a portion of a semiconductor wafer, indicated generally by reference numeral 10 which has been conditioned for junction depth measurement by one prior art technique. The wafer has a substrate 12 on which has been formed three additional layers 14, 16 and 18. By way of example, the layer 14 may be the collector of a bipolar transistor, layer 16 may be the base of the transistor, and layer 18 the emitter of the same transistor.

The wafer 10 has been angle-lapped at a very small angle with respect to the wafer surface. The lap angle is shown greatly exaggerated for purpose of illustration, but it will be apparent that the lapped surface exposes the junctions between the successive layers on the wafer 10. Treatment with an acid, such as hydrofluoric acid (HF), and subsequent exposure to intense light results in p-type regions assuming a darker color than n-type regions, and allows the various layers to be more easily identified. Measurement along the lapped face of the wafer 10 provides a measure of the junction depths, assuming that the lap angle is known and maintained to a high degree of accuracy.

Another technique of the prior art is shown in FIG. 2, in which the same reference numerals are used for convenience. A cylindrical groove of relatively large radius is formed in the surface of the wafer 10 exposing the various junctions between adjacent layers of the wafer. It will be apparent that, if a junction is parallel with the surface of the wafer, the junction will appear on the surface of the groove as a pair of parallel lines, one on each side of the groove. The junction lines are accentuated by appropriate staining treatment, as in the first method described. If the width of the groove at the wafer surface is measured as $W_1$ and the width of the groove at a junction is measured as $W_2$, the junction depth $x_j$ is given by the expression:

$$x_j = (R^2 - R_2^2)^{\frac{1}{2}} - (R^2 - R_1^2)^{\frac{1}{2}}$$

where
$R_1 = W_1/2$
$R_2 = W_2/2$
R = Radius of the cylindrical groove

It will be apparent from this formula that the accuracy of the technique is very much diminished when $W_1$ and $W_2$ are very nearly equal, as is the case for shallow junction depths.

In accordance with the present invention, a wafer 10, having layers 12, 14, 16 and 18 and in which a junction depth is to be determined, is ground or otherwise machined to form a recess 20 having a concave wall surface 20A which intersects the planes of the wafer junctions along curved intersection lines 22. According to the preferred practice of the invention, the recess 20 is a cylindrical groove formed by a wafer grooving tool 23 whose longitudinal axis is inclined at an angle A to the surface of the wafer, resulting in a groove that is slightly tapered in width and depth.

The angle A is exaggerated for purposes of illustration, and the tool 23 and wafer 10 are not drawn to scale. For the types of wafer structures with which the invention is principally concerned, the junction depths are only a few microns (one micron is $10^{-6}$ meter). The tool 23 typically has a diameter of 1.5 inches and the angle A need only be a few minutes, where one minute is a sixtieth of a degree. Of course, both the angle A and the depth of cut should be selected appropriately for the junction depths being measured. The principal criterion is that each junction must intersect the deepest part of the groove surface.

As shown in FIG. 4, since each of the junctions between the layers of the wafer 10 now intersects the cylindrical surface of the groove at an angle, the line of intersection shows up not as a pair of parallel lines, but as a continuous line forming a portion of an elliptical curve. Moreover, as each junction line traverses the middle or deepest portion of the groove, it exhibits a peak or apex that is clearly identifiable. For example, the junction between the emitter layer 18 and the base layer 16 has a peak indicated at 24 in FIG. 4. Similarly, the junction between the base layer 16 and the collection layer 14 has a peak shown at 26, and the junction between the collector layer 14 and the substrate 12 has a peak shown at 28.

The peak is indicative of the actual depth of the junction between the layers 16 and 18, as the sectional view of FIG. 5 clearly shows. Thus, to measure this junction depth directly a profilometer stylus 30 is traversed across the groove at the section line 5—5 in FIG. 4, passing through the peak 24 of the junction line to be measured. The profilometer may be any of a number of such instruments available. Basically it includes some means for amplifying the axial movement of its stylus as the stylus is passed over a surface to be examined. The result may be plotted graphically on a chart recorder, or displayed on a cathode ray tube, depending on the equipment selected. In the experiment to be described the profilometer used was an Alpha-Step profiler made by Tencor Instruments, Mountain View, Calif. The groover employed was a Model 2105C wafer groover made by Philtec Instrument Co., Philadelphia, Pa.

In a test of the method, a triple-diffused monitor wafer of one-micron geometry was used. The monitor wafer accompanied a production wafer lot through many of a conventional sequence of processing steps, but not including photoresist steps by means of which the various layers are patterned. Thus the monitor wafer has the same junction depths as the other wafers in the lot. The layer implantations were $1.5 \times 10^{13}$ cm$^{-2}$ phosphorus at 60 kev, $3 \times 10^{14}$ cm$^{-2}$ boron at 90 kev, and $5 \times 10^{15}$ cm$^{-2}$ arsenic at 50 kev. After completion of the processing the emitter, base and collector junctions were nominally at depths of 0.35, 0.50 and 1.60 microns, respectively.

Two grooves were made across the wafer, at a taper angle of 6.89'. It will be understood, however, that the taper angle is not critical to the direct measurement technique of the invention. Then the grooves were stained in a conventional manner using hydrofluoric acid and nitric acid, and exposure to intense light. Regions of p-type material are in this way stained darker than n-type materials, so that the junctions can be readily identified. The profilometer stylus 30 was aligned for ten traverses through each of the peaks 24, 26 and 28 on each of the two grooves. The results of typical traverses are shown in FIGS. 6a-6c, for the peaks 24, 26 and 28, respectively. The following table gives the mean and standard deviation values in angstroms ($10^{-10}$ meter) for each of the junctions in each of the two grooves:

| Groove | Values | Emitter/Base | Base/Coll. | Coll./Substr. |
|---|---|---|---|---|
| 1 | mean | 3390 | 4816 | 16,140 |
|   | std. dev. | 102 | 95 | 156 |
| 2 | mean | 3349 | 5288 | 15,998 |
|   | std. dev. | 127 | 170 | 175 |

It will be apparent from the table that the profilometer measurements are highly reproducible. The standard deviation for all three junction depths was in the range 100–200 Å. The reproducibility with respect to junction indication, as evidenced by the figures for the two different grooves, is also encouraging. The two measurements for each of the junctions differ from their mean by less than 200 Å. Another interesting comparison is between the junction depths obtained by the disclosed technique and the depths of the metallurgical junctions as obtained by an established alternative procedure, such as Rutherford back scattering (RBS). This evaluation, which is limited to the accuracy of the RBS technique, shows an accuracy of 100–200 Å.

It will be appreciated from the foregoing that the present invention represents a significant advance in the field of junction depth measurement for integrated circuitry. In particular, the invention provides a novel, convenient, but highly accurate and repeatable method for the measurement of junction depths. It will also be appreciated that, although a specific embodiment of the invention has been described in detail for purposes of illustration, various modifications can be made without departing from the spirit and scope of the invention. Accordingly, the invention is not to be limited except as by the appended claims.

We claim:

1. A method for determination of depths of junctions between successive layers in an integrated circuit wafer, said method comprising the steps of:
   forming in the surface of the wafer a groove that is tapered in depth and width whereby each interlayer junction appears as a part-elliptical line having a peak at the center of the groove indicative of the perpendicular junction depth; and
   directly measuring the depth of a junction of interest at a point in the groove identified by a peak in the junction line on the groove surface.

2. A method as set forth in claim 1, wherein said step of directly measuring includes:
   aligning a profilometer stylus with the peak in a selected junction line on the groove surface;
   traversing the profilometer stylus across the groove, passing through the peak in the selected junction line; and
   measuring the depth of the groove at the peak in the selected junction line, and thereby obtaining a direct measure of the selected junction depth.

3. A method as set forth in claim 1, wherein:
   said forming step is performed with a wafer groover having a relatively large diameter with respect to the junction depths being measured.

4. A method as set forth in claim 3, wherein said step of directly measuring includes:
   aligning a profilometer stylus with the peak in a selected junction line on the groove surface;
   traversing the profilometer stylus across the groove, passing through the peak in the selected junction line; and
   measuring the depth of the groove at the peak in the selected junction line, and thereby obtaining a direct measure of the selected junction depth.

5. A method as set forth in claim 1, and further including the step of treating the groove surface to enhance the contrast between successive layers, said treating step including cleaning the surface of the wafer to remove debris after said forming step and staining the groove surface.

6. A method as set forth in claim 5, wherein said step of directly measuring includes:
   aligning a profilometer stylus with the peak in a selected junction line on the groove surface;
   traversing the profilometer stylus across the groove, passing through the peak in the selected junction line; and
   measuring the depth of the groove at the peak in the selected junction line, and thereby obtaining a direct measure of the selected junction depth.

7. A method as set forth in claim 5, wherein said staining step includes:
   treating the groove surface with acid; and
   exposing the groove surface to intense light.

8. A method as set forth in claim 7, wherein said step of directly measuring includes:
   aligning a profilometer stylus with the peak in a selected junction line on the groove surface;
   traversing the profilometer stylus across the groove, passing through the peak in the selected junction line; and
   measuring the depth of the groove at the peak in the selected junction line, and thereby obtaining a direct measure of the selected junction depth.

9. A method for determination of depth of a junction between successive layers in an integrated circuit wafer, said method comprising the steps of:
   forming in the surface of the wafer a recess having a concave wall surface which intersects the interlayer junctions along visible curved intersection lines; and
   directly measuring the depth of each junction of interest by measuring the recess depth at a point of tangency of an intersection line and a plane normal to the wafer surface.

10. A method as set forth in claim 9, wherein said step of directly measuring includes:
    aligning a profilometer stylus with said plane;
    traversing the profilometer stylus across the recess in said plane; and
    measuring the depth of the recess at said point.

11. A method as set forth in claim 10 wherein:
    said intersection line is generally eliptical and has a peak, and said point is located at said peak.

* * * * *